United States Patent

Saville

[11] Patent Number: 5,911,511
[45] Date of Patent: Jun. 15, 1999

[54] TILTING PAD FOIL THRUST AND JOURNAL BEARINGS

[75] Inventor: Marshall Saville, Torrance, Calif.

[73] Assignee: AlliedSignal Inc., Morristown, N.J.

[21] Appl. No.: 08/938,989

[22] Filed: Sep. 26, 1997

[51] Int. Cl.$^6$ ............................ F16C 32/06; F16C 17/06
[52] U.S. Cl. ..................... 384/106; 384/103; 384/306; 384/309
[58] Field of Search ...................... 384/103, 104, 384/105, 106, 117, 122, 303, 306, 307, 308, 309, 310, 311, 312

[56] References Cited

U.S. PATENT DOCUMENTS

| | | | |
|---|---|---|---|
| 643,934 | 2/1900 | Benners | 384/310 X |
| 4,073,549 | 2/1978 | Christ et al. | 384/122 |
| 4,227,752 | 10/1980 | Wilcock | 384/106 |
| 4,331,365 | 5/1982 | Miller, Jr. | 384/105 |
| 4,674,963 | 6/1987 | Morishita et al. | 384/306 X |
| 4,714,357 | 12/1987 | Groth et al. | 384/312 |
| 4,730,998 | 3/1988 | Kakuda et al. | 384/312 X |
| 4,738,550 | 4/1988 | Gardner | 384/306 |
| 5,222,815 | 6/1993 | Ide | 384/117 |

*Primary Examiner*—Thomas R. Hannon
*Attorney, Agent, or Firm*—Robert Desmond, Esq

[57] ABSTRACT

The present invention provides a foil journal bearing including at least one support pad mounted inside a journal sleeve, and onto which foils are mounted. The support pad is mounted to the journal sleeve in a manner allowing it to tilt in response to foil loading variations and shaft misalignment. The present invention further provides a foil thrust bearing including at least one support pad mounted to a thrust plate and onto which the foils are mounted. The support pad is similarly mounted in a manner allowing it to tilt. The support pads in either configuration may be tapered in thickness to provide an optimized compliant backing for the foils.

16 Claims, 6 Drawing Sheets

TILTING PAD FOIL THRUST AND JOURNAL BEARINGS

TECHNICAL FIELD

This invention relates generally to compliant foil gas bearings. More particularly, the present invention relates to tiltably mounted compliant foil gas thrust and journal bearings.

BACKGROUND OF THE INVENTION

Process fluid or gas bearings are utilized in a number of diverse applications. These fluid bearings generally comprise two relatively movable elements with a predetermined spacing therebetween filled with a fluid such as air, which, under dynamic conditions, form a supporting wedge sufficient to prevent contact between the two relatively movable elements.

Improved fluid bearings, particularly gas bearings of the hydrodynamic type, have been developed by providing foils in the space between the relatively movable bearing elements. In a typical journal bearing, the relatively movable bearing elements comprise a stationary housing having a bore, and a rotating member such as a shaft with a bearing surface passing through the bore. The foils are mounted to the housing within the bore in a surrounding relationship to the bearing surface of the rotating member. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect. The ready availability of relatively clean process fluid or ambient atmosphere as the bearing fluid makes these hydrodynamic, fluid film lubricated, bearings particularly attractive for high speed rotating machinery.

In order to properly position the compliant foils between the relatively movable bearing, elements, a number of mounting means have been devised. In journal bearings. At it is conventional practice to mount the individual foils in a slot or groove in one of the bearing elements as exemplified in U.S. Pat. No. 3,615,121.

To establish stability of the foils in most of these mounting means, a substantial pre-load is required on the foil. That is, the individual foils must be loaded against the relatively movable bearing element opposed to the bearing element upon which the foils are mounted. It has been conventional to provide separate compliant stiffener elements or undersprings beneath the foils to supply this required preload as exemplified in U.S. Pat. Nos. 3,893,733, 4,153,315, and 5,116,143.

The undersprings typically include a number of corrugations. As shown in the '143 patent, these corrugations may be varied in width and stiffness to provide a support spring with a predetermined circumferential variation in support stiffness. Such a spring optimizes the spring force supporting the overlying foil so as to improve the match between the foil stiffness and the circumferential pressure distribution along the foil, and thereby maintain an optimum wedge shaped spacing between the shaft and the foil. By thus tailoring the foil support stiffness to the pressure distribution, the load carrying capacity of the bearing is increased.

Similarly, the undersprings may include means for reducing the exerted spring force at the axial edges of the foils to account for diminished dynamic fluid forces on the foil, and thereby prevent rubbing contact. One such means for reducing the spring force is described in U.S. Pat. No. 5,116,143 comprising cutouts or windows near the axial ends of the curvilinear support beams or corrugations. The cutouts are configured to approximate the spring force to the decrease in the overlying dynamic fluid pressure profile. The improved match of support stiffness to fluid pressure profile results in an increased overall load carrying capacity.

Variable stiffness undersprings can also provide load capacity benefits in a thrust bearing application. One such arrangement shown in U.S. Pat. No. 5,110,220 includes a foil thrust bearing underspring disk having a radially increasing spring force or load capacity. The underspring disk includes sets of three spring sections spaced apart radially, with the outer spring section having a greater spring force resilience than the radially inner spring sections. For example, the spring sections each include a plurality of corrugations, and the peak to peak length of the corrugations is shorter for the radially outer spring section than for the radially inner spring sections.

Although foil bearings of the type described above are able to accommodate some eccentricity of the rotating member and provide a degree of cushioning and dampening effect, large misalignment between the relatively rotatable members can alter the bearing load distribution. Misalignment can occur particularly in high-speed or high-temperature applications such as might be associated with a gas turbine engine, as a result of thermal gradients and pressure loads causing distortion of the housing and shafting. In addition, the more complex and the greater the number of components making up the structure, the greater the likelihood of misalignment at the bearings. The resulting altered dynamic pressure load direction on the foils can substantially reduce the load carrying capacity of the bearings, and ultimately result in break down of the film and damage to the bearing.

Overload of conventionally mounted foil journal bearings can also occur as a result of an instability at certain critical shaft speeds inherent in the shafting and structure design. Substantial radial shaft deflection at the bearing locations can occur when the shafting is operated at rigid body critical speeds, or multiples thereof. The radial deflection takes the form of a whirl of the shafting, where the whirl speed is less than the shaft rotation speed. The shaft whirl causes the pressure loading distribution on the bearings to depart from the optimal distribution designed for, resulting in a breakdown of the film and decrease in load carrying capacity.

Accordingly, a need exists for a foil journal bearing and a foil thrust bearing for use in high speed turbomachinery which can accommodate large relative misalignments of the housing and shafting without significant loss in load carrying capacity.

Need also exists for a foil journal bearing for use in high speed turbomachinery that can accommodate variations in a pressure load direction on the foils without loss of load carrying capacity.

Yet another need exists for a foil bearing that provides an optimized compliant backing for the underspring and foils without use of a variable stiffness underspring.

SUMMARY OF THE INVENTION

In view of the above, it is an object for this invention to provide a foil journal bearing and a foil thrust bearing for use in high speed turbomachinery which can accommodate misalignments, large relative to the thickness of the foil, of the housing and shafting without significant loss in load carrying capacity.

It is another object for this invention to provide a foil journal bearing for use in high speed turbomachinery that can accommodate variations in pressure load direction on the foils without loss of load carrying capacity.

It is yet another object for this invention to provide a foil bearing that provides an optimized compliant backing for the underspring and foils without use of a variable stiffness underspring.

The present invention achieves these objects by providing a tilting pad journal foil bearing for rotatably supporting a shaft within a bore in a housing. The tilting pad bearing includes a bushing mounted in the bore, at least one bearing support pad mounted inside the bushing, at least one foil disposed between the support pad and shaft, and a compliant member, or underspring, between the foil and bearing support pad urging the foil against the shaft. The bearing support pad is mounted to the bushing in a manner allowing it to tilt in response to changes in pressure load on the foils and misalignment of the shafting.

The present invention further provides a tilting pad thrust foil bearing comprising a thrust runner, a thrust plate to rotatably support the thrust runner, at least one bearing support pad disposed therebetween and tiltably mounted to the thrust plate, at least one foil disposed between the bearing support pad thrust runner, and an underspring urging the foil element against the thrust runner. The bearing support pad is similarly mounted to the thrust plate in a manner allowing it to tilt in response to changes in pressure load on the foils and misalignment of the shafting. The bearing support pads of either the thrust or journal bearing may be tapered in thickness to provide an optimized compliant backing for the underspring and foil.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 1:
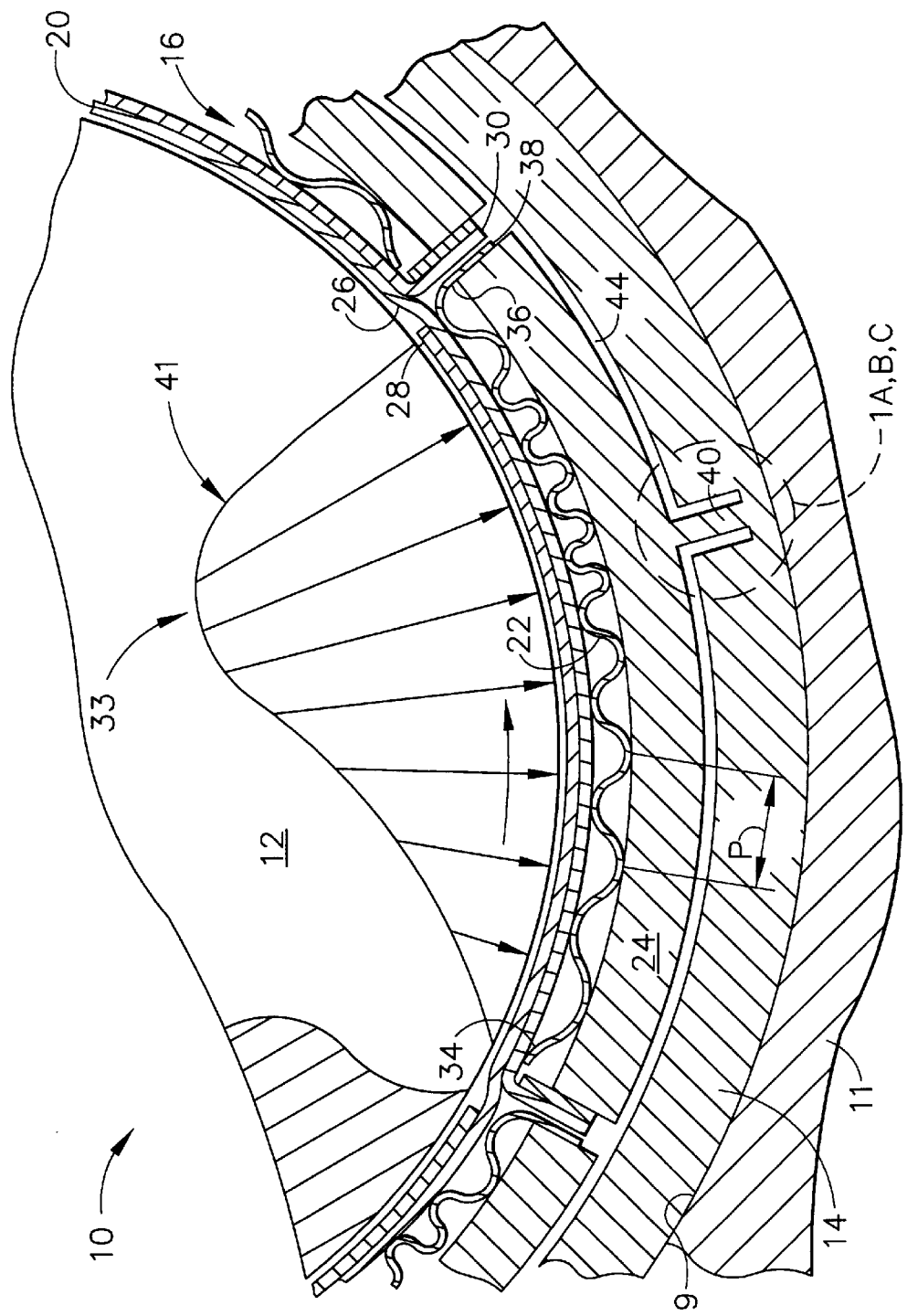
FIG. 1 is an illustration of a partial sectional view of a portion of a rotating machine containing a journal foil bearing in accordance with the present invention as viewed along the engine axis of rotation.

An illustration of a cross-sectional view of a portion of a high speed rotation machine 10, such as a gas turbine engine, is shown in FIG. 1, including generally a shaft 12 rotatably supported by a foil bearing 16 mounted within a bore 9 in a housing 11. The foil bearing 16 generally comprises a bushing 14 mounted inside the bore 9, a plurality of individual, preferably overlapping, compliant foils 20, a number of individual compliant foil stiffener elements or undersprings 22, and a corresponding number of bearing support pads 24 positioned between the foils 20 and the bushing 14. Both the foils 20 and the undersprings 22 are mounted to the support pads 24, and the support pads 24 are mounted to the bushing 14. While a minimum of three tilt support pads is typically required to support a 360° bearing, any greater number support pads 24 can be used in practice with success.

The foils 20 have a first edge 26 for mounting to the support pad 24, and a second edge 28 at the opposite end. The edges can be also be identified in relation to the direction of shaft 12 rotation that is represented by arrow 13. In the illustrated embodiment the first edge 26 might be referred to as the leading edge while the second edge 28 might be referred to as the trailing edge. However it should be noted that either the first or the second edge can be mounted to the support pad 24 without particular preference for which is the leading or trailing edge. That is the trailing edge rather than the leading edge can be mounted to the support pad 24. The individual curved foils 20 typically comprise a thin compliant metallic material. In the illustrated embodiment the foil 20 is illustrated as having an integral mounting flange 30 at the leading edge 26, the mounting may alternatively be made by a separate mounting bar attached to the foil leading edge as is shown for instance in U.S. Pat. No. 5,116,143, or by mounting deployed intermediate the ends of the foil as shown in U.S. Pat. No. 4,178,046 or other similar method.

Figure 2:
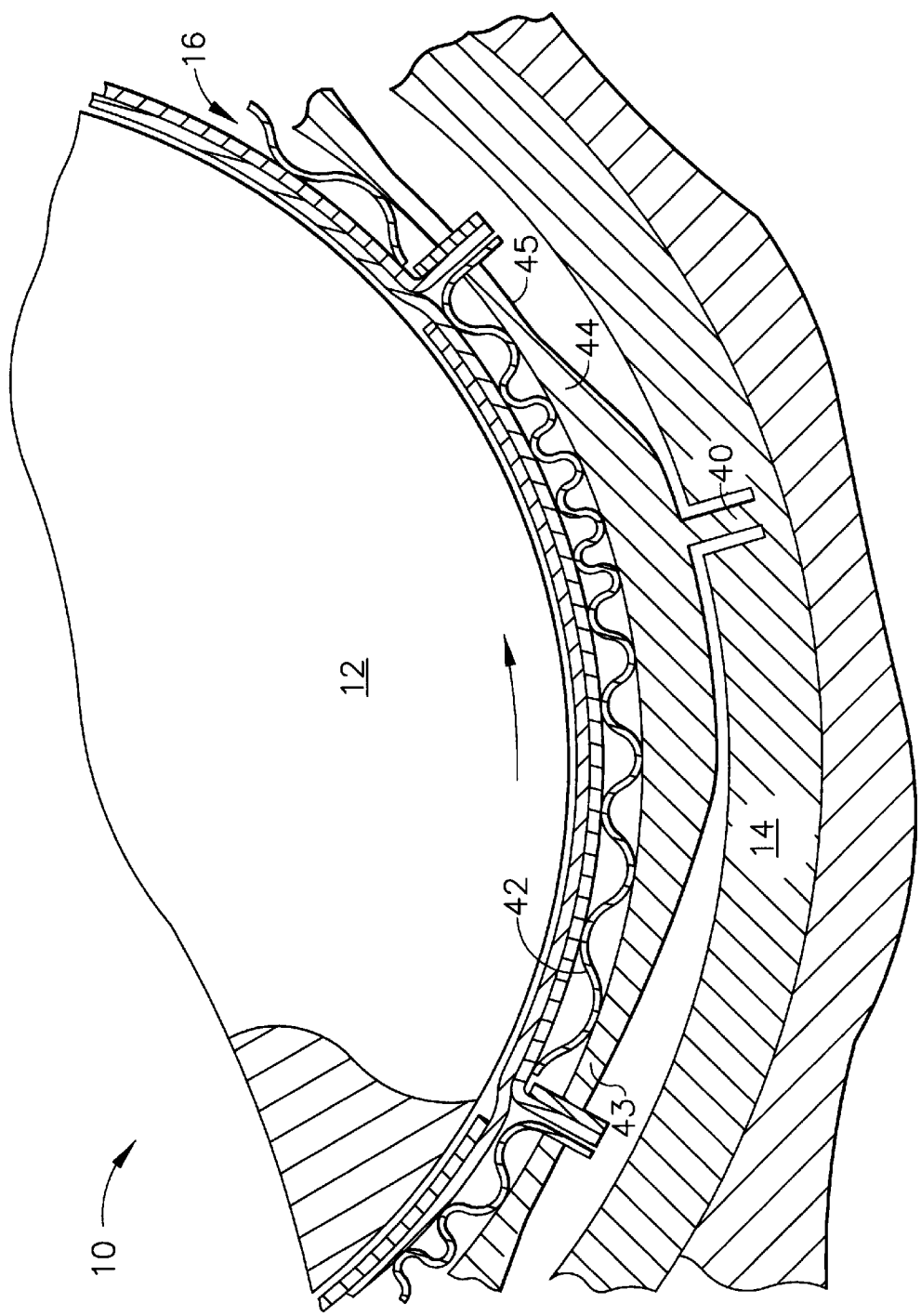
FIG. 2 is an illustration of a partial cross-sectional view of the journal foil bearing showing an alternative bearing support pad to that shown in FIG. 1.

Similarly each underspring 22 can be considered to have a leading edge 34 adjacent the foil leading edge 26, and a trailing edge 36 adjacent the foil trailing edge 28. The undersprings are shown in FIG. 2 mounted to support pads 24 by means of an integral flange 38 extending from the spring's trailing edge 36. Alternatively, the underspring may be anchored by means of a flange extending from the spring's leading edge 34. The underspring 22 and foils 20 may be rigidly attached to the ends of the support pad 24, such as by spot welding, or simply trapped in place between pad ends.

The foil bearing can advantageously employ one or more variable stiffness members such as a variable stiffness member underspring 22 or a variable stiffness member support 24 or both in combination.

In the preferred embodiment shown in FIG. 1 the underspring 22 can be a variable stiffness member. The underspring 22 can be comprised of sheet metal formed into corrugations 23. The corrugations can be formed in the circumferential direction, that is the radius of the spring varies moving circumferentially along the spring, as seen in FIG. 1, but remains constant moving axially, or parallel to the bearing's axis of rotation along the spring. The underspring 22 can be a variable stiffness type such as that described in U.S. Pat. No. 5,116,143. As described in the '143 patent, the foil support stiffness provided by the spring can be tailored by varying, the peak-to-peak distance between corrugations 23 in the circumferential direction. This peak-to-peak distance is known as the stiffness dimension and is denoted in FIG. 1 by the letter 'P'. By varying the stiffness 'P', the support stiffness provided by the underspring 22 can be matched to an optimal circumferential pressure load direction (profile) along the overlaying foil, and thereby maintain an optimized wedge shaped spacing between the rotating shaft 12 and foils 20 for an optimized fluid film. For purposes of 'illustration, a typical optimal pressure profile 41 is superimposed on FIG. 1, and shows the variation in pressure load on the foil from the leading edge 26 to the trailing edge 28. An alternate variable stiffness member is disclosed in U.S. Pat. No, 4,262,975.

Alternatively, as shown in the illustration of FIG. 2, a constant stiffness support spring 42 may be used in conjunction with a variable thickness support pad 44 to achieve the same result. The radial thickness of the variable thickness pad 44 varies with circumferential position, thinning toward its circumferential ends 43 and 45. This causes the thinner end portions 43 and 45 to be more compliant than the rest of the pad 44. By tailoring the shape and amount of taper, the foil support stiffness can be controlled so as to match the optimal pressure distribution and optimize the film shape, thereby obviating the need for a variable stiffness underspring.

Figure 2A:
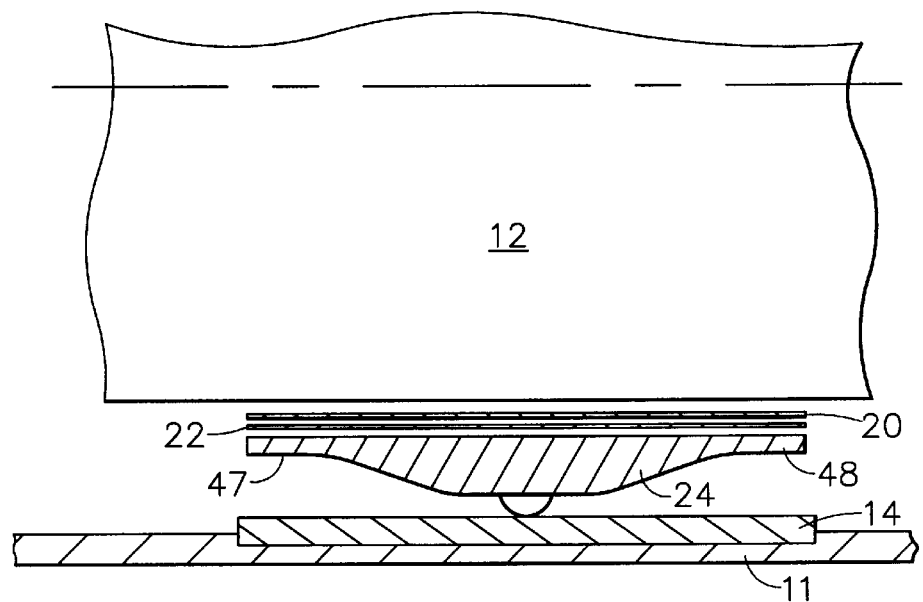
FIG. 2A is an illustration of a partial cross sectional view of the foil journal bearing shown in FIG. 2 viewed along a line perpendicular to the axis of rotation.

Similarly, the dynamic pressure on the foils diminishes approaching their axial edges, thus it is desirable to provide axially varying compliance in the foil backing as well. One method described in U.S. Pat. No. 5,116,143 varies the compliance of the underspring by providing T-shaped slots therein near the spring's axial edges. The present invention contemplates achieving the same result without modification of the underspring. Referring to FIG. 2A, the support pad 44 can be tapered in the axial direction, thinning toward axial ends 47 and 48, to provide increased compliance near the axial edges of the foils. The amount of taper may be adjusted so as to provide a support stiffness that matches the axial pressure distribution, and maintains a wedge-shaped film near the edges, thereby preventing rub.

Referring again to FIG. 1, the support pads 24 are connected to the bushing 14 by means of an axially extending flexible rib 40. As depicted in FIG. 1, the rib 40 can be integral with both the support pad 24 and bushing 14, defining a gap 44 therebetween. The rib 40 is flexible enough to allow the support pad 24 to tilt in a radial plane in response to departures from the optimal loading distribution on the foils. Ideally the rib 40 is positioned directly under the center of pressure 33 noted on the optimal pressure profile 41 so as to minimize tilting of the pad 24 and bending of the rib 40 during operation.

Although the rib is shown integral with both the bushing and pad in FIGS. 1 and 2, the pad and bushing, and even the rib may be separate pieces. One such configuration is shown in FIG. 1A, wherein an integral rib 50 extends from the support pad 24 into an axially extending slot 46 formed in the bushing 14. By axially extending, it is meant that the slot 46 is disposed along a line parallel to the axis of rotation of the foil bearing 10. Alternatively, the rib could be integral with the bushing 14 extending into a slot defined in the support pad, or consist of a completely separate piece extending into slots in both the support pad and bushing.

Figure 1C:
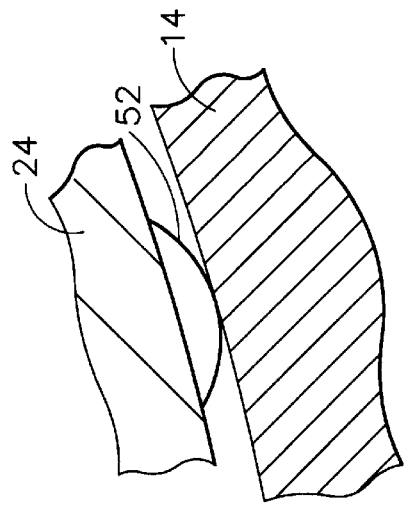
FIG. 1C is an illustration of the same enlarged view as FIG. 1A showing another alternative bearing support pad mounting configuration.
Figure 1B:
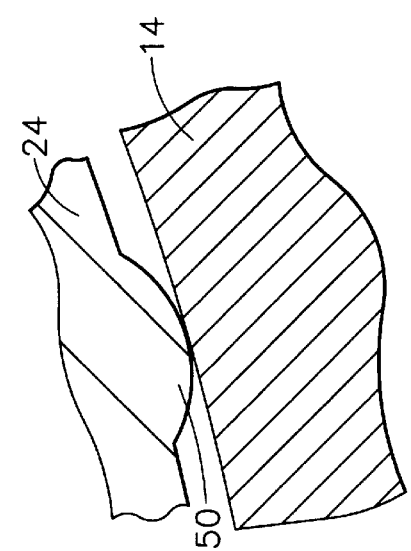
FIG. 1B is an illustration of the same enlarged view as FIG. 1A showing an alternative bearing support pad mounting configuration.
Figure 1A:
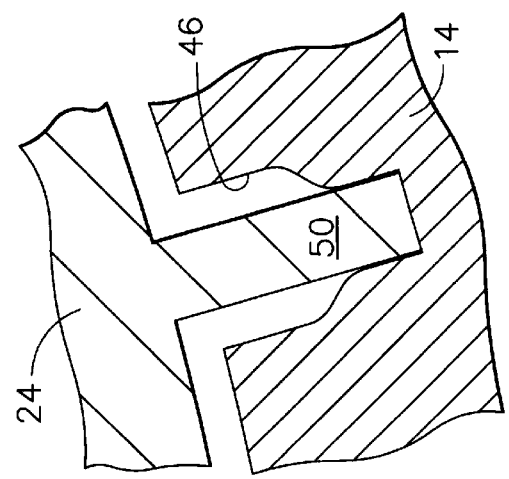
FIG. 1A is an illustration of an enlarged fragmentary sectional view of an encircled portion of FIG. 1.

Depicted in FIGS. 1B and 1C are two alternatives to the flexible rib 40. An axially extending semi-cylindrical shaped pivot 50 integral with the pad 24 is shown in FIG. 1B. The cylindrical pivot 50 defines an axial line of contact between the pad 24 and bushing 14 about which the pad can tilt in a radial plane. As with the flexible rib configuration, the cylindrical pivot 50 is ideally located relative to the pad ends directly under the center of pressure for that pad.

Shown in FIG. 1C is a pad with an integral semi-spherical shaped pivot 52 extending therefrom. The spherical pivot 52 defines a single point contact between the pad 24 and bushing 14 about which the pad 24 may tilt. The single point contact allows the pad 24 to tilt in all directions, not just in a radial plane, and thereby accommodate axial variations in load distribution and axial misalignment of the shaft and bearing in addition to circumferential loading variations. The spherical pivot 52 is also preferably located circumferentially at a position directly under the center of pressure, and located axially beneath the center of pressure in the axial direction. Freedom to tilt in all directions could alternatively be achieved by use of a similarly located flexible dowel (not shown). Preferably the dowel would be integral with the pad, extending therefrom into a drilled hole in the bushing.

Figure 3:
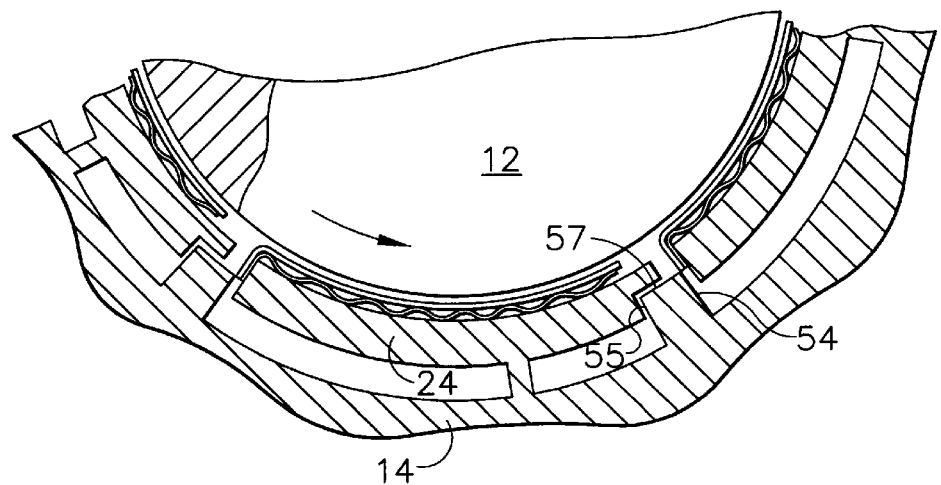
FIG. 3 is an illustration of a partial sectional view of the journal foil bearing of the present invention including an anti-rotation feature.

Referring to FIG. 3, the bushing 14 preferably includes an integral anti-rotation stop 54 positioned between the ends of pads 24. The stop 54 is configured to prevent the pads 24 from sliding circumferentially by providing a surface 55 against which the ends of pad 24 may abut. The stop 54 may also be used to limit the amount the pads can tilt by providing a surface 57 positioned to radially abut a portion of the pad 24. Such an anti-rotation stop may be beneficially used in conjunction with pads supported by any of the ribs and pivots described hereinabove.

Figure 4:
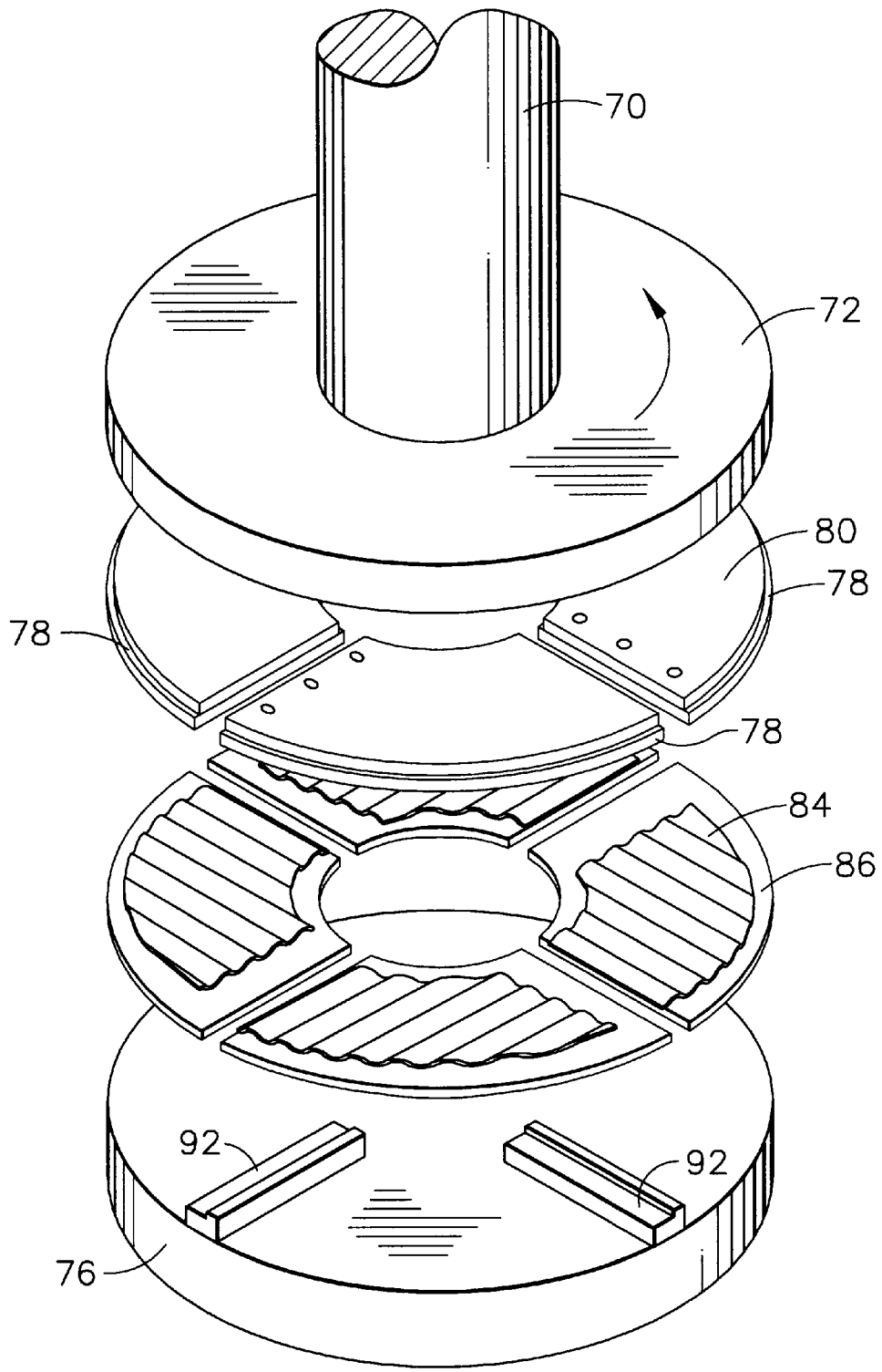
FIG. 4 is an illustration of an exploded perspective view of a thrust foil bearing of the present invention.

A illustration of a thrust bearing embodiment is shown in FIGS. 4–7. Referring first to FIG. 4, a runner 72 extending from a rotating shaft 70 is rotatably supported on a thrust plate 76 by a plurality of fluid thrust bearing sections 78. Each section 78 includes a compliant foil 80 mounted atop an underspring 84, and support pad 86. The underspring 84 and support pad 86 provide load support for the compliant foils 80. The compliant foil 80 is mounted to pad 86 by means of an integral flange 88, shown in FIG. 6, which may be welded to the pad ends, or simply trapped between sections 78. The thrust plate 76 includes an anti-rotation stop 92 positioned between bearing sections which is utilized to maintain the position of the bearing sections 78 with respect to each other and the thrust plate 76. The stop 92 may additionally provide stability to the foil bearings 78 by limiting the amount of pad tilt.

Figure 5:
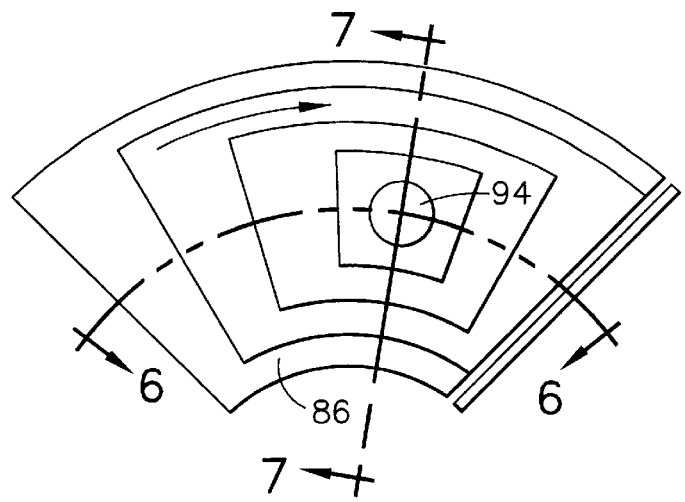
FIG. 5 is an illustration of a partial sectional view of the thrust foil bearing of FIG. 4.
Figure 6:
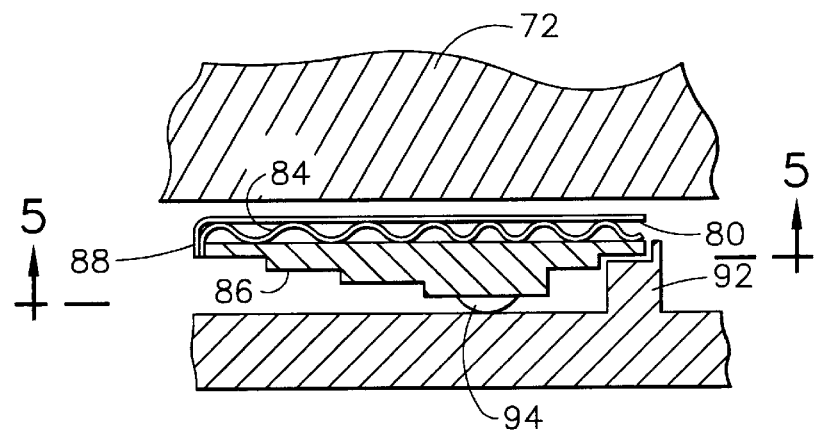
FIG. 6 is an illustration of a cross-sectional view along lines 6—6 of FIG. 5 of the thrust foil bearing.
Figure 7:
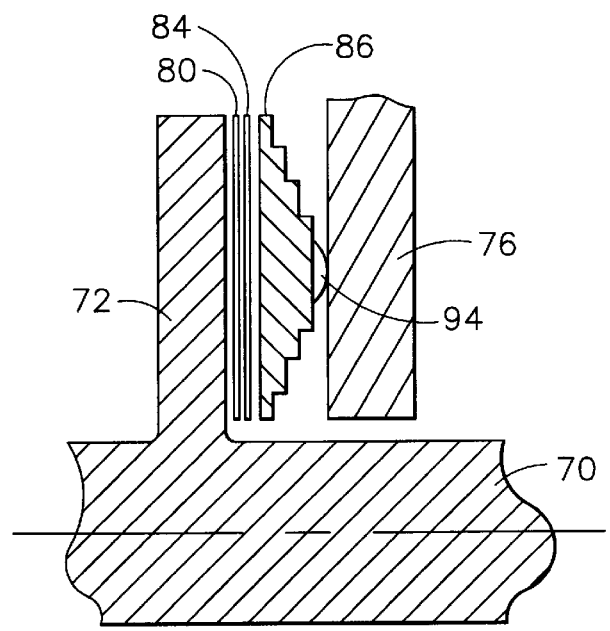
FIG. 7 is an illustration of a cross-sectional view along lines 7—7 of FIG. 5 of the thrust foil bearing.

The support pads 86 may be either mounted to the thrust plate 76 by a semi-spherical shaped pivot 94 as depicted in FIGS. 5–7, or by a flexible dowel type pivot of the type described above in reference to the journal bearing configuration. The pivot 94 is ideally located at the center of pressure of each individual pad 86. The pivot 94 allows the thrust bearing sections 78 to tilt in response to variations in the loading distribution on the foils. The tilting bearings can accommodate load variations originating from various causes, including misalignment of the shaft 70 and thrust plate 76, and deformation of runner 72 or thrust plate 76 under thrust load.

The support pads 86 are preferably tapered in the circumferential direction as shown in FIG. 6, from a maximum thickness proximate the spherical pivot 94 stepping down to a minimum thickness near the circumferential edges. Circumferentially tapering the pads 86 tailors the foil support stiffness so as to provide greater compliance toward the pad edges. The tapered pads 86 may be used in combination with a constant stiffness underspring to provide an optimal pressure distribution and film shape.

The support pads 86 are tapered in the radial direction, as shown in FIG. 7. Under the dynamic conditions depicted in FIG. 6, the support pad 86 and underspring 84 support the thrust runner 72 on a cushion of air or pressurized fluid. For each section 78 fluid film pressure increases radially to a maximum at the radius corresponding to the center of pressure due to the radial velocity gradient. In addition, the pressure between the relatively rotating thrust runner 72 and foils 84 is dependent on the relative velocity. Thus higher pressures are generated at the radially outer portions of the bearing 78 than at the inner portions. In order to maintain a constant fluid film thickness it is necessary to provide greater support stiffness nearer the outside edges of the bearing. One solution has been a three-part variable stiffness spring, described in U.S. Pat. No. 5,110,220. The three part spring provides a radially increasing support stiffness to match the radially increasing pressure profile and thereby maintain a constant film thickness and shape. An alternative variable stiffness spring can include windows within the spring material.

The pivotably mounted tapered support pads 86 of the present invention are designed to provide the desired radially increasing stiffness when used in conjunction with a constant stiffness underspring. Referring to FIG. 7, the pad thickness increases in step fashion with increasing radius out to the center of pressure location coincident with pivot 94 to match the increasing pressure profile. Pad thickness then decreases from the pivot point outward corresponding to the decline in pressure from the center of pressure to the outer edge. By thus matching the radial pressure profile a more uniform foil deflection and constant film thickness is maintained across the radial width of the foils 84, and total bearing load capacity is maximized.

Thus, the present invention provides a foil journal bearing and a foil thrust bearing with tiltably mounted bearing support pads for use in high speed turbomachinery, capable of accommodating misalignments of the housing and shafting as well as variations in a pressure load direction on the foils without significant loss in load carrying capacity, and without the need for variable stiffness undersprings or support pads. The misalignments that can be accommodated are large relative to the shaft journal separation.

Various modifications and alterations of the above described foil bearings will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A bearing for allowing a relative motion between a first member and a second member, the bearing comprising:
    a foil disposed between the first and second members;
    a compliant member underlying the foil, the compliant member being disposed between the foil and the second member; and
    a tiltable support pad structure between the compliant member and the second member, the tiltable support pad structure including a support pad underlying the compliant member, the tiltable support pad structure further including a support member extending from the pad and terminating in an end that is abutted against the second member.

2. The bearing of claim 1, wherein said support member comprises a rib integral with said bearing support pad and extending the majority of the axial width of said support pad, said rib mounted into an axially extending groove in said second member.

3. The bearing of claim 1, wherein said support member extends radially into a mating recess defined in said second member.

4. The bearing of claim 1, wherein said support member has a rounded end in pivotal contact with said second member at a single point.

5. The bearing of claim 1 wherein said bearing support pad tapers in radial thickness, thinning toward a minimum thickness at the circumferential ends of said pad.

6. The bearing of claim 1, further comprising an axially extending projection from said second member, said projection having a face for abutting a trailing edge of said bearing support pad with respect to the direction of rotation of said first member, thereby preventing circumferential sliding of said support pad.

7. The bearing of claim 1 wherein said foil is mounted to said bearing support pad by means of a flange integral with the leading edge of said foil with respect to the direction of rotation of said first member, said flange extending radially between ends of adjacent bearing support pads.

8. A bearing for allowing a relative motion between a first member and a second member, the bearing comprising:
    a foil disposed between the first and second members;
    a compliant member underlying the foil, the compliant member being disposed between the foil and the second member; and
    a tiltable support pad disposed between the compliant member and the second member, the tiltable support pad tapering in thickness to a minimum thickness at outside edges of the support pad.

9. The bearing of claim 8 wherein said support pad is mounted to said second member by a flexible member extending from the support pad to said second member.

10. The bearing of claim 9 wherein said flexible member is integral with said support pad and extends radially into a recess defined in said thrust plate.

11. The bearing of claim 8 wherein said support pad is mounted to said second member by a projection from said support pad, said projection having a rounded end in pivotal contact with said second member at a single point.

12. The bearing of claim 8 wherein said compliant member comprises sheet metal formed into a plurality of uniformly spaced corrugations extending across a majority of the radial width of said compliant member.

13. The bearing of claim 8 further comprising a radially extending projection from said second member, said projection having a face for abutting the trailing edge of said bearing support pad with respect to the direction of rotation of said second member, thereby preventing circumferential motion of said pad.

14. A turbomachine comprising:
    a rotatable shaft;
    a housing;
    at least one bearing for mounting said shaft to said housing, said bearing comprising:
        a bushing circumscribing said shaft and spaced therefrom;
        at least one tiltable support pad structure between said bushing and said shaft, the tiltable support pad structure including a support pad and a support member extending from the pad and terminating in an end that is abutted against the bushing;
        at least one foil mounted to said support pad and disposed between said pad and said shaft; and
        a compliant member disposed between said foil and said support pad for urging said foil into contact with said shaft.

15. The turbomachine of claim wherein said support pad tapers in thickness to a minimum thickness at outside edges of the support pad.

16. The turbomachine of claim 14 wherein said support member includes a projection in pivotal contact with said bushing.

* * * * *